US008346856B2

(12) United States Patent
Kagitani

(10) Patent No.: US 8,346,856 B2
(45) Date of Patent: Jan. 1, 2013

(54) CLIENT ENVIRONMENT CREATION SYSTEM, CLIENT ENVIRONMENT CREATION METHOD, CLIENT ENVIRONMENT CREATION PROGRAM AND STORAGE MEDIUM

(75) Inventor: Toshiya Kagitani, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 12/919,547

(22) PCT Filed: Mar. 2, 2009

(86) PCT No.: PCT/JP2009/054349
§ 371 (c)(1),
(2), (4) Date: Aug. 26, 2010

(87) PCT Pub. No.: WO2009/110620
PCT Pub. Date: Sep. 11, 2009

(65) Prior Publication Data
US 2011/0010420 A1  Jan. 13, 2011

(30) Foreign Application Priority Data

Mar. 7, 2008  (JP) ................................. 2008-057599

(51) Int. Cl.
*G06F 15/16* (2006.01)
(52) U.S. Cl. ........ 709/203; 709/224; 709/223; 709/201; 709/229; 709/226; 711/112; 711/114; 711/170; 711/173; 711/163
(58) Field of Classification Search .................. 709/203, 709/227, 230, 223
See application file for complete search history.

(56) References Cited

U.S. PATENT DOCUMENTS

| 6,157,380 | A | * | 12/2000 | Bennett et al. | ................ 715/769 |
| 6,636,587 | B1 | * | 10/2003 | Nagai et al. | ................ 379/88.14 |
| 7,062,559 | B2 | * | 6/2006 | Yoshimura et al. | ........... 709/226 |
| 7,225,462 | B2 | * | 5/2007 | Bass et al. | ......................... 726/6 |
| 7,426,624 | B2 | * | 9/2008 | Fukuguchi et al. | ........... 711/173 |
| 2009/0094372 | A1 | * | 4/2009 | Nyang et al. | ................. 709/229 |
| 2012/0246311 | A1 | * | 9/2012 | Kagitani | ..................... 709/224 |

FOREIGN PATENT DOCUMENTS

| JP | 8-161393 A | 6/1996 |
| JP | 2000003333 A | 1/2000 |
| JP | 2004171412 A | 6/2004 |
| JP | 2005107851 A | 4/2005 |
| JP | 2005242999 A | 9/2005 |
| JP | 2006018347 A | 1/2006 |
| JP | 2007272297 A | 10/2007 |
| JP | 2007310686 A | 11/2007 |
| JP | 2007334686 A | 12/2007 |

OTHER PUBLICATIONS

International Search Report for PCT/JP2009/054349 mailed Apr. 21, 2009.
Japanese Office Action for JP2008-057599 mailed on Apr. 23, 2012.
Hideki Kawamata, •gUniform management of users in plural systems: implementation of single log-in starts•h, Nikkei Computer, No. 474, pp. 32-33, Jul. 19, 1999, Nikkei Business Publications, Inc., Japan.

* cited by examiner

*Primary Examiner* — Jude Jean Gilles

(57) ABSTRACT

A client environment creation system which creates a client environment to which a user connects is provided. A user information management server which stores user information on a user and a management server which creates a client environment associated with the user based on the user information are included.

17 Claims, 10 Drawing Sheets

CLIENT ENVIRONMENT CREATION SYSTEM, CLIENT ENVIRONMENT CREATION METHOD, CLIENT ENVIRONMENT CREATION PROGRAM AND STORAGE MEDIUM

TECHNICAL FIELD

The present invention relates to a client environment creation system.

BACKGROUND ART

In recent years, a thin client system, in which client environments are concentrated on a server, has been receiving attention from the viewpoint of putting importance on security. The thin client system generates a client environment, configures a user and a terminal, which can connect to the client environment, and performs connection control for the user or the terminal. In this processing of the configuring and of the connection control, the client environment and the connection configuration between the user and the client environment, in addition to the user and an attribute attached to the user, have been separately managed, respectively. For this reason, man-hours for these control tasks are necessary. Meanwhile, the attribute includes a name of division, a charged work or the like. The client environment includes an operating system (OS: Operating System) to be used, an application (AP: APplication software) to be used or the like. The connection configuration between the client environment and the user includes association between the user and the client environment, indicating which user uses which client environment.

For example, when the division, to which the user belongs, is changed by a personnel transfer, the following tasks are necessary. That is, (a) the attribute attached to the user, such as the division, is changed. (b) The existing client environment is eliminated, and a new client environment is built. (c) The connection configuration between the user and the new client environment is changed. According to these, necessary tasks for an administrator increases.

Furthermore, when three items, i.e. information on the user, information on the client environment and information on configuration of a connection destination, are managed separately, a mismatch may occur among these three information items according to a human error by the administrator. According to this mismatch, the following problems might occur.

(1) When an appropriate client environment is not created, or when an appropriate connection destination is not configured, the user cannot connect to the client environment.

(2) The client environment, that is not used, may lead to a security hole.

(3) When the configured connection destination is not appropriate, an unauthorized user may connect to the client environment.

As a related art, Patent Application Laid-Open No. 2004-171412 (patent document 1) discloses a virtual PC (Personal Computer) rental system.

In this related art, when a request for lending a virtual PC is inputted from the client terminal, an ID of the virtual PC and a name of the virtual PC are generated, and they are registered in a form being correlated with a user ID. When the user inputs the virtual PC name from a client terminal, by lending out a corresponding virtual PC environment, the virtual PC environment becomes available via a network. Software can also be lent out simultaneously along with a virtual PC environment, and thus the user can select freely a virtual PC environment to be used and software to be used.

Japanese Patent Application Laid-Open No. 2000-003333 (patent document 2) discloses a client server system and a recording medium.

This related art discloses a client server system including: a server computer for managing an environment, in which data processing is performed for each user; and a client computer. In this client server system, when an environment for performing data processing in a client computer is configured, the server computer copies an environment for performing data processing for the user in the client computer of the user who has requested it.

Also, Japanese Patent Application Laid-Open No. 2005-107851 (patent document 3) discloses a setup method for a client computer and a server client system.

In this related art, a company-specific application installer installs an application needed to be installed individually for each customer company to set a company-specific environment. The company-specific application installer is generated for each customer company in advance, and is stored in a memory unit. When a company-specific configuration script is carried out by a client computer, the company-specific application installer corresponding to the company, to which a user belongs, is carried out based on the identification information of the user using the client computer.

Japanese Patent Application Laid-Open No. 2005-242999 (patent document 4) discloses an application integrated management system.

In this related art, each record of an application policy DB (database) includes an ID for identifying a policy, a policy type which indicates a type such as convocation to an integrative system or withdrawal from an integrative system and an identifier of an application which should cooperate according to this policy type. This record further includes an ID for managing a policy, a withdrawal state and a block such as the name of an application which should withdraw. Meanwhile, among identifiers of applications which are required cooperation, an identifier that withdraws the integrative system when an application or an application set by the application has ended is defined as an application which should leave.

Japanese Patent Application Laid-Open No. 1996-161393 (patent document 5) discloses a transaction processing system.

In this related art, a file server manages a file shared by each client, and stores an entity of a file of organization structure information and destination information. The organization structure information is information, in which association among a post of the organization, the structure of the organization and a user is registered. The organization structure information on each of the client is a virtual file. The file entity of the organization structure information arranged on the file server is shared by a business management client and an operation execution client. As a result, matching is realized as one piece of organization structure information within an organization using the network.

Patent document 1: Japanese Patent Application Laid-Open No. 2004-171412

Patent document 2: Japanese Patent Application Laid-Open No. 2000-003333

Patent document 3: Japanese Patent Application Laid-Open No. 2005-107851

Patent document 4: Japanese Patent Application Laid-Open No. 2005-242999

Patent document 5: Japanese Patent Application Laid-Open No. 1996-161393

DISCLOSURE OF INVENTION

Technical Problem

A problem to be solved in the present invention is, in a system in which client environments are concentrated on a server and a user connects to the client environment from a remote terminal device to use, to manage information on a generated client environment, information on the user and configuration information on the connection between the user and the client environment with less man-hours and without an error.

The related art described in patent document 1 aims at lending to an individual. However, in an organization where personnel transfers of users frequently occur, unified management of virtual PC environments is necessary. Accordingly, in such organization, this related art has difficulty in operation.

The related art described in patent document 2 is to generate an operation actual condition environment based on correspondence between a user name and an operation group, and is not suited for the operation in an organization that needs association taking account of information on a division and a work associated with a user.

In the related art described in patent document 3, a part for managing user information is divided into two, and handling a change in user information, by such as personnel transfer, would be difficult.

In the related art described in patent document 4, a user name is correlated with an application available, to generate a client environment, but operating in an organization, in which generating a client environment is necessary to be based on information on a division and a work associated with a user, is difficult.

In the related art described in patent document 5, working environment information is distributed to a client environment, to carry out work, which a user is in charge of, but it merely specifies correspondence between the work and the user, who is in charge of the work, and does not create a client environment for each user.

An object of the present invention is to provide a client environment creation system which solves the problem mentioned above.

Solution to Problem

A client environment creation system of the present invention is a client environment creation system, which creates a client environment, to which a user connects, including: a user information management server, which stores user information on the user; and a management server, which creates a client environment associated with the user based on the user information.

A client environment creation method of the present invention is a client environment creation method for creating a client environment, to which a user connects, including: a step of managing user information on the user; and a step of creating a client environment associated with the user based on the user information.

A client environment generation program of the present invention is a program for making a computer carry out: a step of managing user information on a user; and a step of associating with the user based on the user information, to create a client environment, to which the user connects.

A storage medium of the present invention is a storage medium which stores a program for making a computer carry out: a step of managing user information on a user; an a step for associating with the user based on the user information, to create a client environment, to which the user connects.

Advantageous Effect of Invention

According to the present invention, since creation of a client environment to be used and configuration of a connection destination are performed automatically, only by managing a user and an attribute attached to the user, management costs can be reduced. Also, influence of a human error can be suppressed by reducing managed information, and achieve improvement of efficiency and security in operation.

DESCRIPTION OF EMBODIMENTS

The first exemplary embodiment of the present invention will be described with reference to the accompanying drawings below.

Figure 1:
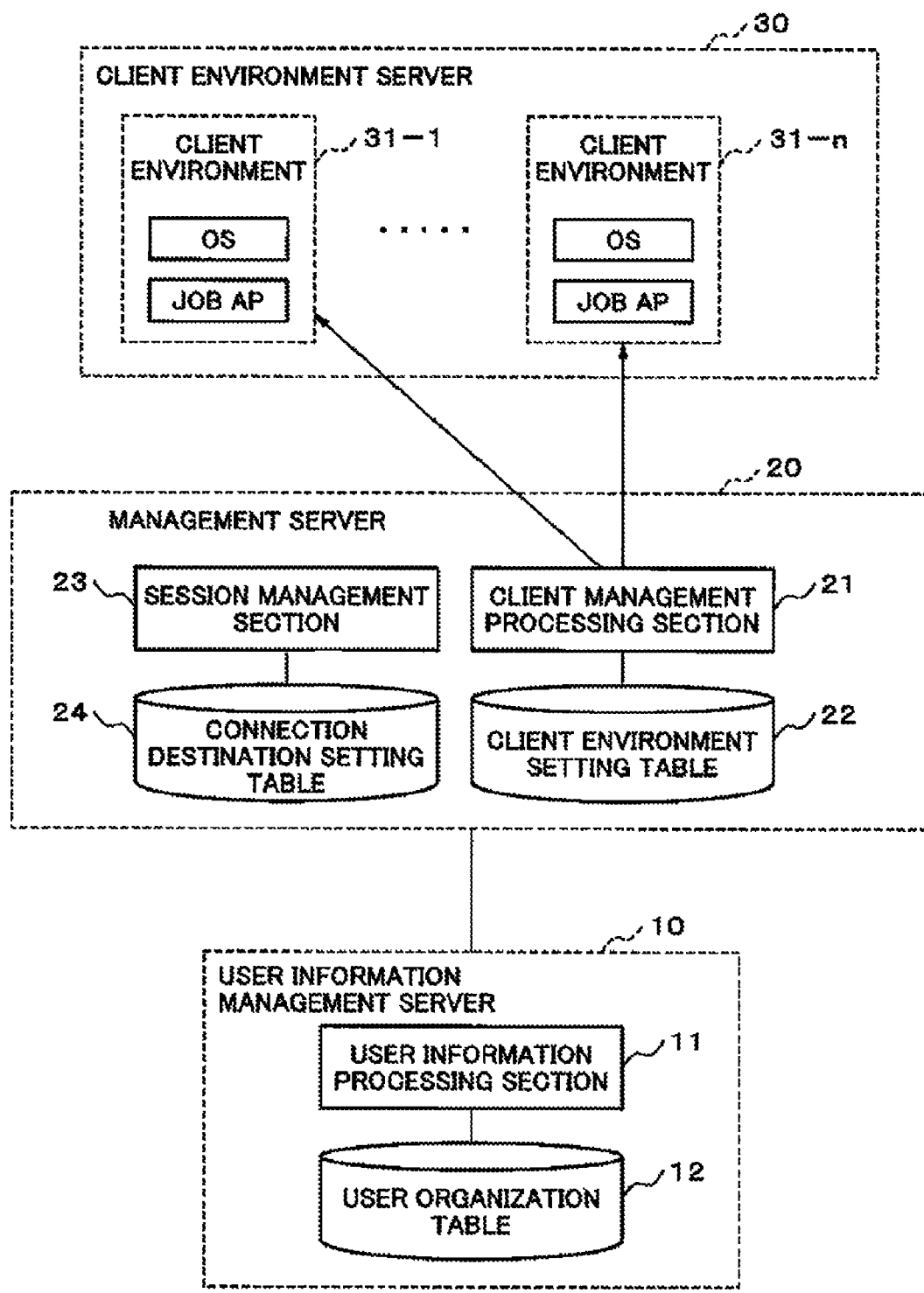
[FIG. 1] A block diagram showing a schematic configuration of a first exemplary embodiment of a client environment creation system of the present invention.

Referring to FIG. 1, a client environment creation system of the first exemplary embodiment includes a user information management server 10, a management server 20 and a client environment server 30.

The user information management server 10 manages user information. The management server 20 creates a client environment and manages a connection to a generated client environment. The client environment server 30 includes a client environment, to which a user connects, i.e. the client environment operates on the client environment server 30. Meanwhile, practically, the user information management server 10, the management server 20 and the client environment server 30 may be an identical server apparatus. For example, each of the user information management server 10, the management server 20 and the client environment server 30 may be a virtual machine (VM: Virtual Machine) environment, which operates on an identical server apparatus.

The user information management server 10 includes a user information processing section 11 and a user organization table 12.

The user information processing section 11 refers to the user organization table 12. According to a request from the management server 20, the user information processing section 11 provides data from the user organization table 12 to the management server 20. When an attribute attached to the user is changed, the user information processing section 11 automatically associates the user and the changed attribute attached to the user, to update the user organization table 12.

The user organization table 12 stores information on correspondence between the user and the attribute attached to the user. Here, the user organization table 12 includes personnel information, indicating, e.g. which group the user belongs to, and stores information on correspondence between the user and a belonging group.

Figure 2:
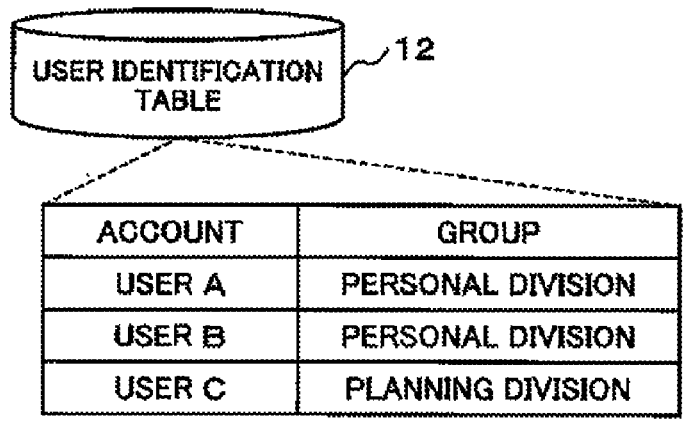
[FIG. 2] A diagram showing an example of a user organization table.

An example of the user organization table 12 will be described with reference to FIG. 2.

The user organization table 12 includes an account and a group. The account and the group are associated. Preferably, the account and the group may correspond one-on-one to each other. Here, a user A is stored in Account, and the Personal Division is stored in Group. A user B is stored in Account, and the Personal Division is stored in Group. A user C is stored in Account, and the Planning Division is stored in Group. However, it is not limited to these examples.

Returning to FIG. 1, the management server 20 includes a client management processing section 21, a client environment configuration table 22, a session management section 23 and a connection destination configuration table 24.

The client management processing section 21 refers to the user organization table 12 by the user information processing section 11, and determines a model of a client environment to be used for the user, based on the client environment configuration table 22. The client management processing section 21 creates client environments as many as the users in the client environment server 30 based on the determination result. In the client environments on this occasion, the kinds of operating systems (OS) and job applications (the AP) are different depending on the selected model.

The client environment configuration table 22 stores information on correspondence between the attribute attached to the user and the model of the client environment.

Figure 3:
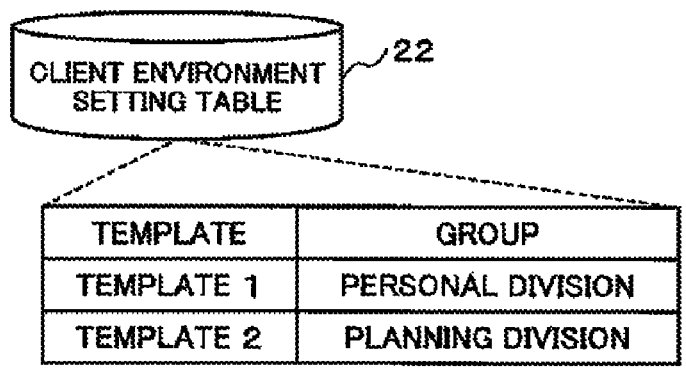
[FIG. 3] A diagram showing an example of a client environment configuration table.

An example of the client environment configuration table 22 will be described with reference to FIG. 3. The client environment configuration table 22 includes a template and a group. The template and the group are associated. Preferably, the template and the group may correspond one-on-one to each other. Here, a template 1 is stored in Template, and the Personal Division is stored in Group. A template 2 is stored in Template, and the Planning Division is stored in Group.

Meanwhile, a template is a model of client environments, in which an OS and an AP used in the client environment are defined. However, it is not limited to these examples.

Returning to FIG. 1, the client management processing section 21 creates a client environment, and, at the same time, the session management section 23 stores an association, to which client environment a user connects, in the connection destination configuration table 24. When there is a connection request from outside, the session management section 23 refers to the connection destination configuration table 24 and connects the user to an appropriate client environment.

The connection destination configuration table 24 stores information on the association between the user and the client environment, to which the user connects.

Figure 4:
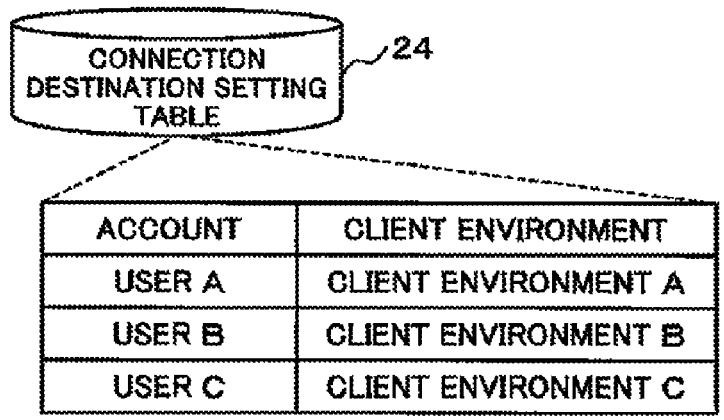
[FIG. 4] A diagram showing an example of a connection destination configuration table.

An example of the connection destination configuration table 24 will be described with reference to FIG. 4.

The connection destination configuration table 24 includes an account and a client environment. The account and the client environment are associated. Preferably, the account and the client environment may correspond one-on-one to each other. Here, a user A is stored in Account, and a client environment A is stored in Client Environment. A user B is stored in Account, and a client environment B is stored in Client Environment. A user C is stored in Account, and a client environment C is stored in Client Environment. However, it is not limited to these examples.

Returning to FIG. 1, the client environment server 30 has a client environment 31 (31-I, I=1 to n: n is an arbitrary integer).

The client environment 31 (31-I, I=1 to n) includes an OS and an AP, and means the environment, to which the user connects.

Next, operation of this exemplary embodiment will be described using a specific example.

Figure 5:
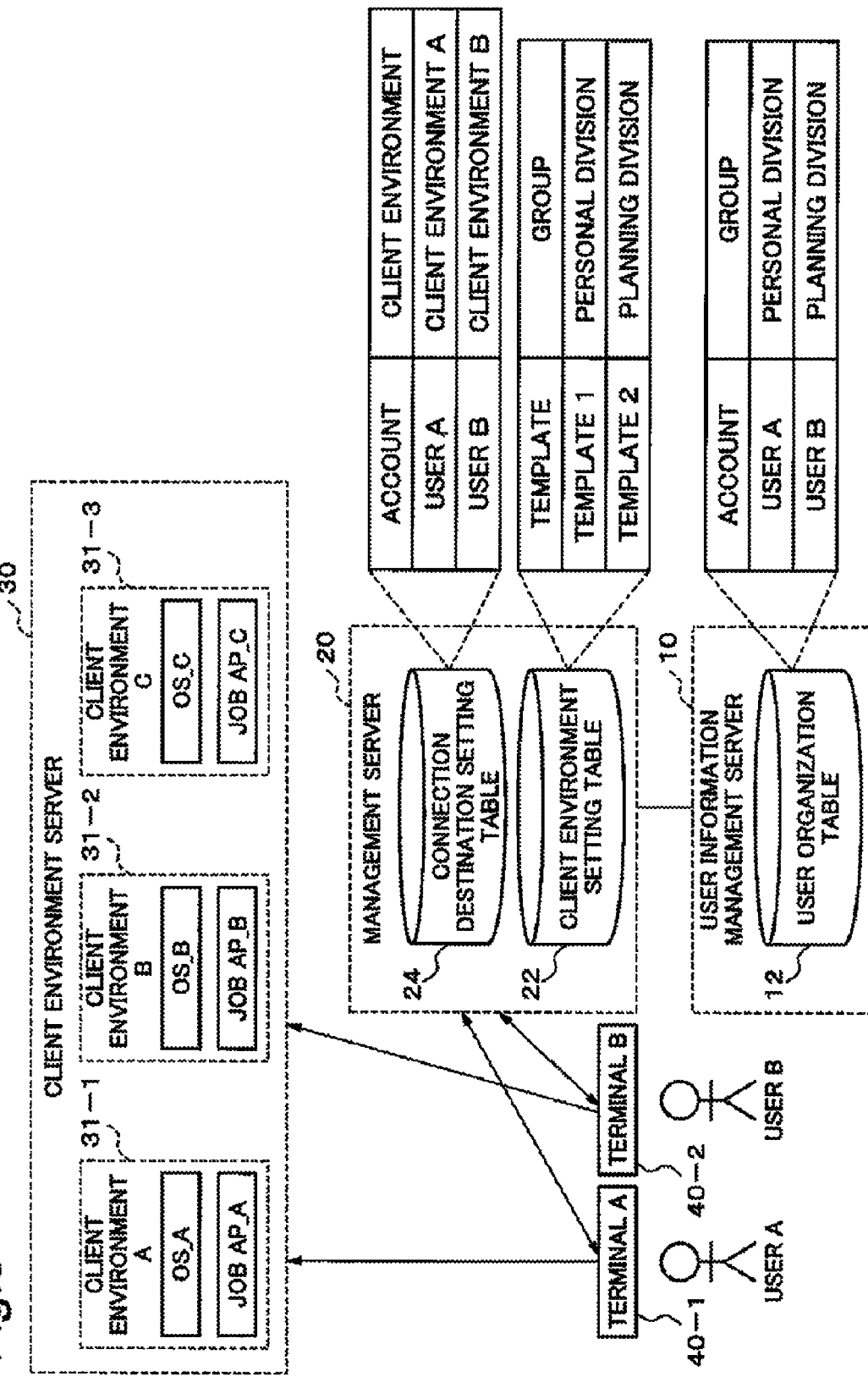
[FIG. 5] A conceptual diagram showing an exemplary configuration according to the first exemplary embodiment.

Referring to FIG. 5, a client environment creation system according to the first exemplary embodiment includes the user information management server 10, the management server 20, the client environment server 30 and a terminal 40 (40-j, j=1 to m: m is the number of users).

Because the user information management server 10, the management server 20 and the client environment server 30 are the same as those in FIG. 1, description will be omitted. Here, as an example of the client environment 31, a client environment A (31-1), a client environment B (31-2) and a client environment C (31-3) are indicated, and their operation will be described.

A terminal 40 (40-j, j=1 to m) is a terminal, which the user uses. Here, the terminal, which user A uses, is called a terminal A (40-1). The terminal, which user B uses, is called terminal B (40-2).

Figure 6:
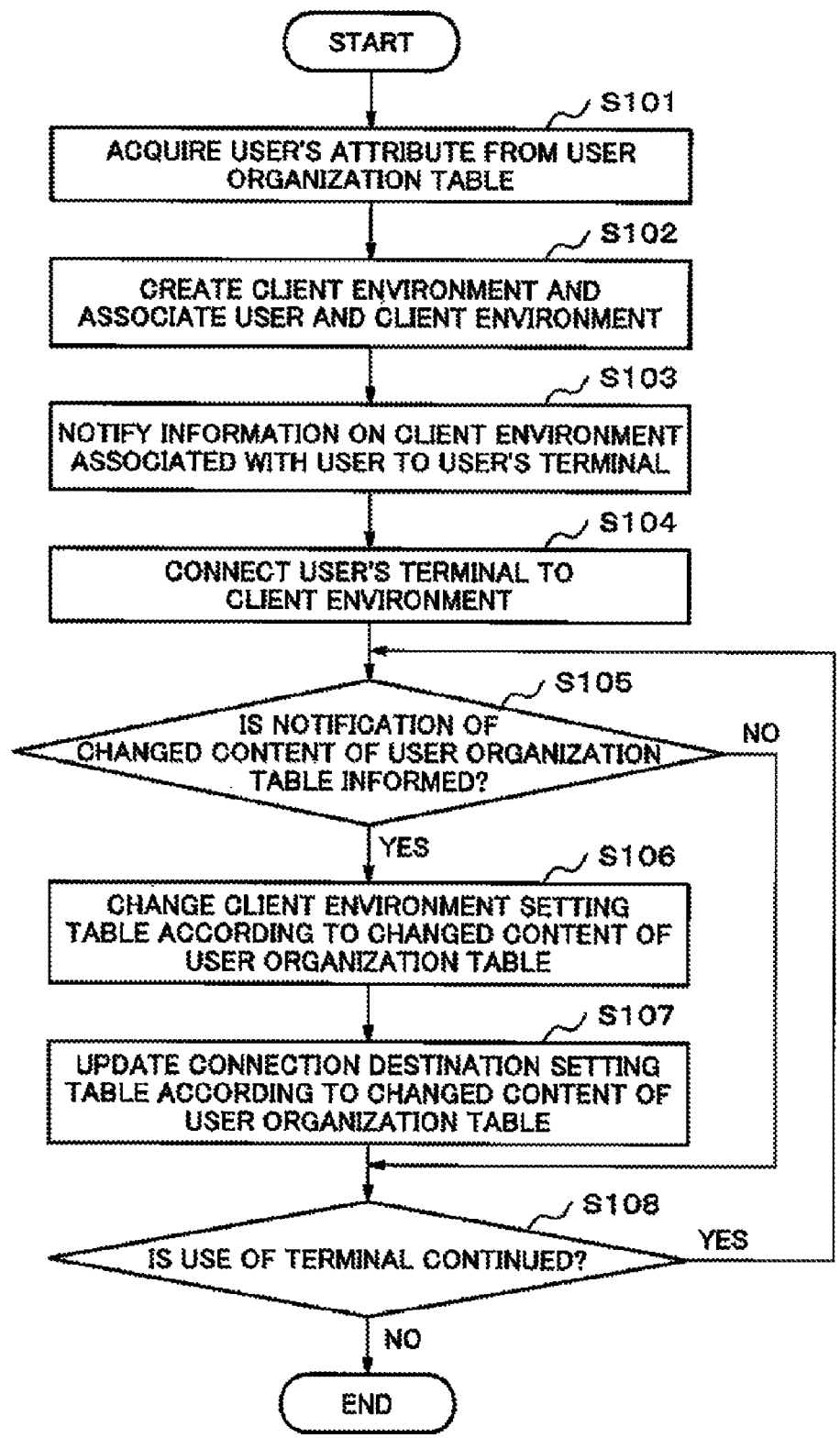
[FIG. 6] A flowchart showing operation of the first exemplary embodiment.

Operation in this exemplary embodiment will be described with reference to FIG. 6.

(1) Step S101

As shown in FIG. 5, an association between the template and the group, which is information related to a client environment, is stored in the client environment configuration table 22. In the user organization table 12, an association between an account and the group is stored. In the initial state, nothing has been stored yet in the connection destination configuration table 24. In the case of creating a client environment of a predetermined user, the management server 20 acquires the attribute attached to the user with reference to the user organization table 12. For example, when a client environment of the user A is created, the management server 20 refers to the user organization table 12 and acquires the attribute attached to the user A. In FIG. 5, the attribute attached to the user A is the Personal Division. Here, the management server 20 refers to the user organization table 12 and acquires the attribute attached to the user A, according to a request from the terminal A (40-1) of the user A. Alternatively, the management server 20 may acquire the attribute attached to the user A with reference to the user organization table 12 according to a condition set in advance.

(2) Step S102

The management server 20 (specifically, the client management processing section 21 of FIG. 1) selects the template A associated with the Personal Division in the client environment configuration table 22, and creates a client environment A (31-1) in the client environment server 30 based on the selected template A. At the same time, the session management section 23 of FIG. 1 stores information on association between the user A and the client environment A in the connection destination configuration table 24. Next, regarding the user B, the management server 20 acquires the attribute attached to the user B with, reference to the user organization table 12. In FIG. 5, the attribute attached to the user B is the Planning Division. Next, the management server 20 selects the template B associated with the Planning Division in the client environment configuration table 22, and creates a client environment B (31-2) in the client environment server 30, based on the template. At the same time, the session management section 23 of FIG. 1 stores information on the association between the user B and the client environment B in the connection destination configuration table 24. When creation of the client environment regarding the user B is completed, a processing for the user C begins, and thus creation processing of a client environment for all users is carried out. In this way, the management server 20 creates the client environments according to the number of users, and stores their associations in the connection destination configuration table 24.

(3) Step S103

The connection destination configuration table 24 can be used for management of a session in a thin client. For example, when the user A uses a client environment from the terminal A (40-1), the user A firstly connects to the management server 20. In response to the connection from the terminal A (40-1) of the user A, the management server 20 (specifically, the session management section 23) acquires information on the client environment A (31-1), which is associated with the user A from the connection destination configuration table 24, and informs it to the terminal A (40-1). The same applies to the case of the user B.

(4) Step S104

The terminal A (40-1) is connected to the client environment A (31-1) based on the information on the client environment A (31-1) that has been notified of. Similarly, in the case of the user B, connection can be made from terminal B (40-2) to the client environment B (31-2).

(5) Step S105

Here, when the user organization table 12 is changed and the group, to which the user A belongs, is changed to the Planning Division (Yes at Step S105), the user information management server 10 notifies the management server 20 of the content of the change of the user organization table 12.

(6) Step S106

The management server 20 is informed of the content of the change in the user organization table 12, and checks the connection destination configuration table 24 and the client environment configuration table 22, based on the content of the change. For example, the management server 20 collates the changed user organization table 12 with each of the connection destination, configuration table 24 and the client environment configuration table 22, and updates the connection destination configuration table 24 and the client environment configuration table 22. Then, with reference to the client environment configuration table 22, the management server 20 recognizes that it is necessary to reconstruct the client environment, which is changed from the template A to the template B.

(7) Step S107

Next, the management server 20 identifies the client environment A (31-1) as the client environment, which the user A uses, from the connection destination configuration table 24, and eliminates the client environment A (31-1) and, at the same time, eliminates the association of the user A from the connection destination configuration table 24. After that, the management server 20 creates a client environment C (31-3) based on the template B, and stores information on association between the user A and the client environment C (31-3) in the connection destination configuration table 24. The OS and the AP of the client environment C (31-3) become identical with the client environment B (31-2) created based on the template B. The user A can connect to the client environment C (31-3) from the terminal A (40-1), and can use the new environment without paying special attention.

Meanwhile, when there is no change in the user organization table 12 (No at Step S105), the processings of Step S106 and Step S107 are not performed.

(8) Step S108

When the user A finishes using the terminal (No at Step S108), the management server 20 eliminates the client environment from the client environment server 30 and finishes the processing. In the case that the user A continues to use the terminal (Yes at Step S108), processing returns to Step S105 and waits for a change in an attribute.

Next, the effects of the first exemplary embodiment will be described.

The first effect of the first exemplary embodiment is that it is possible to create a client environment automatically based on the user and the attribute attached to the user.

The second effect of the first exemplary embodiment is that it is possible to associate the user and the client environment, to which the user connects, automatically based on the attribute attached to the user.

The third effect of the first exemplary embodiment is that, when the attribute attached to the user is changed, creation/deletion of the client environment and association about the client environment can be carried out automatically.

The second exemplary embodiment of the present invention will be described in detail below.

Figure 7:
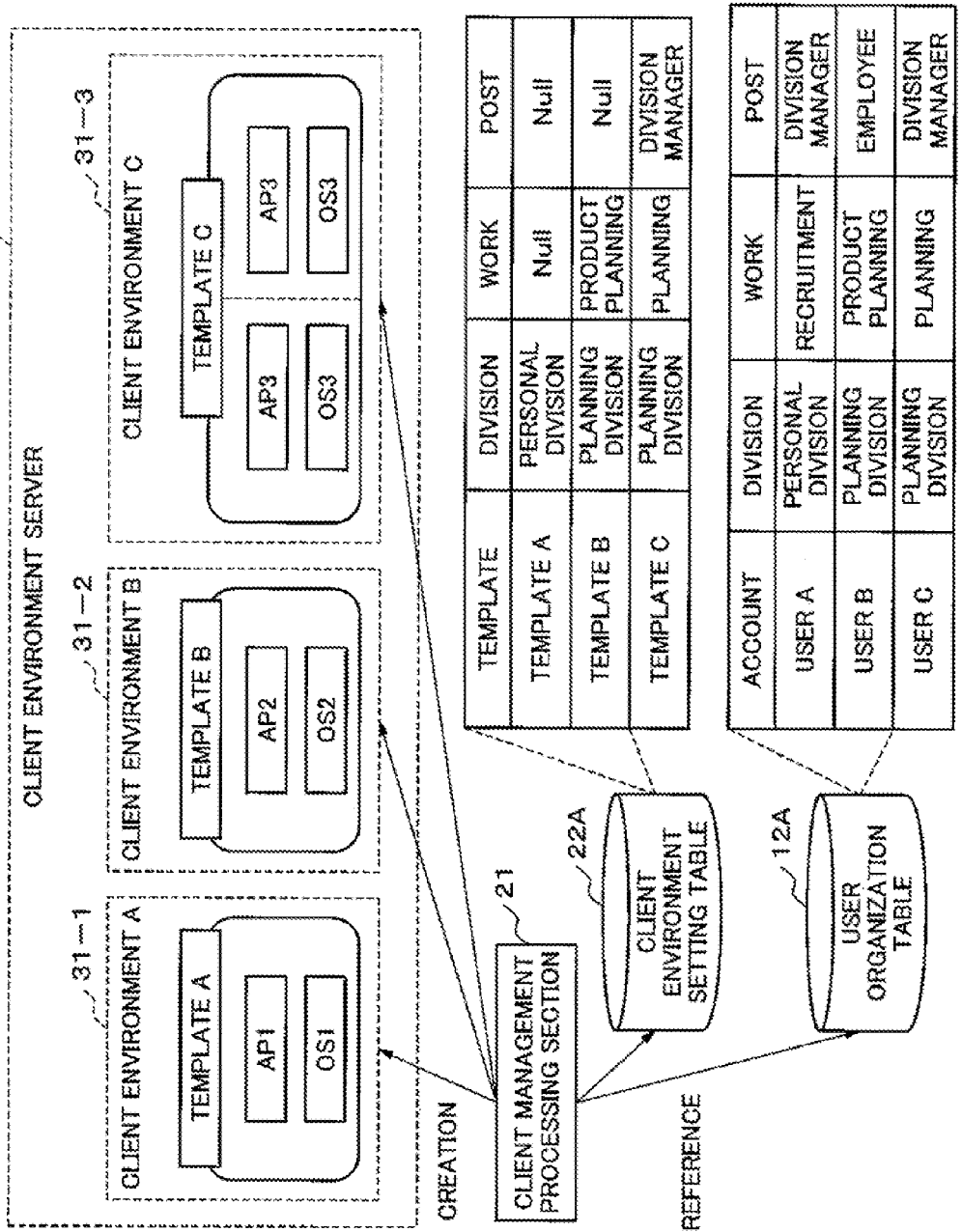
[FIG. 7] A conceptual diagram showing an exemplary configuration according to a second exemplary embodiment.

As shown in FIG. 7, it is possible to select not only one but also a plurality of attributes attached to the user in a user organization table 12A. Here, the user organization table 12A includes Template, Division, Work and Post. In this example, Division, Work and Post all correspond to the attributes attached to the user. A template can be set to each of these attributes in a client environment configuration table 22A. In the client environment configuration table 22A, Null indicates all or not-designated. Accordingly, when, in the attribute attached to the user, Division=Personal Division, regardless of the work and the post of the user, the template A will be selected. In the user organization table 12A, user A falls under this category. When the attribute is Division=Planning Division and Work=Product Planning, the template B is selected. In the user organization table 12A, the user B falls under this case. Template C is selected in the case of Division=Planning Division and Work=Planning and Post=Division Manager. User C falls under this in the user organization table 12A.

Figure 8:
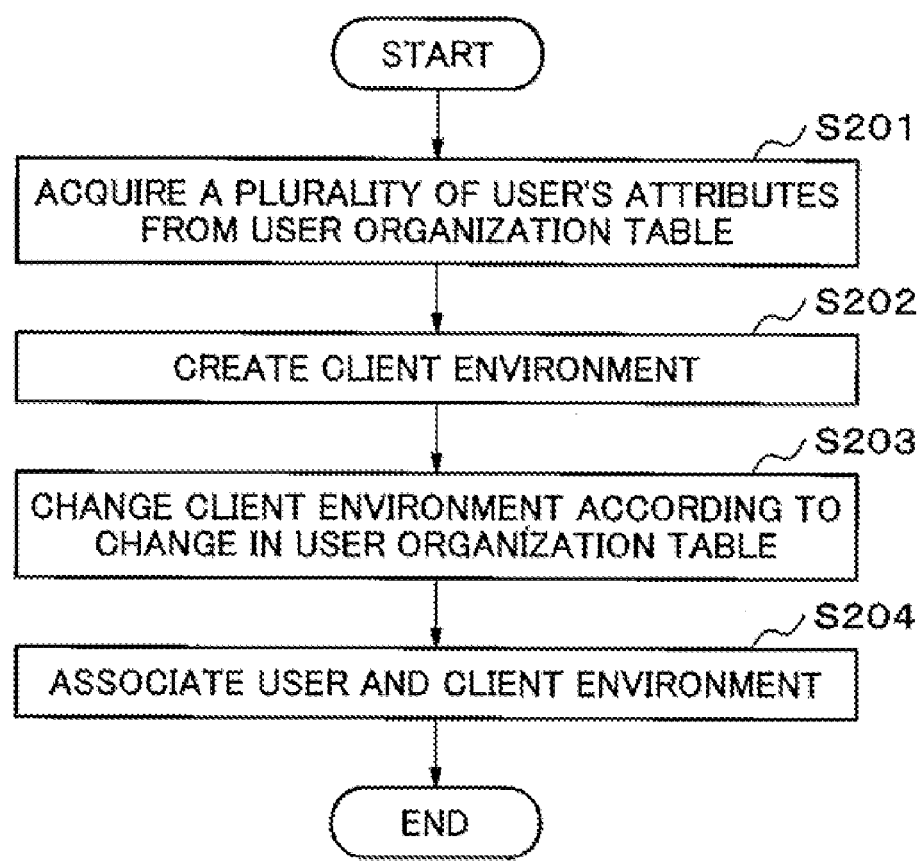
[FIG. 8] A flowchart showing operation of the second exemplary embodiment.

Operation in this exemplary embodiment will be described with reference to FIG. 8. Meanwhile, description and explanation is omitted for a part overlapping with the first exemplary embodiment.

(1) Step S201

At a time when a client environment of a predetermined user is created, the client management processing section 21 acquires a plurality of attributes attached to the user with reference to the user organization table 12A, and selects a template associated with each of the plurality of attributes in the client environment configuration table 22A.

(2) Step S202

The client management processing section 21 creates a client environment in the client environment server 30 based on the selected template. For example, the client environment A (31-1) created using the template A and the client environment B (31-2) created using the template B are different in terms of a content, such as an operating system (OS) or a job application (AP). Also, it is possible to create an environment with a plurality of OSs using one template as in the client environment C (31-3), and the user can use two OS environments by switching them freely.

(3) Step S203

When there is a change in the user organization table 12A, the client environment is also changed automatically. For example, the user A's division is changed to Planning Division and his/her work is changed to Planning, the client environment A (31-1) is eliminated and client environment A' which is not illustrated is created newly based on the template C. The user A can connects with the new client environment A' and use it. However, when the user B's post is changed to a section chief, because a template which is selected in the client environment configuration table 22A is not changed, the client environment B is not eliminated and he/she will connect with the client environment B (31-2) as before. When the account of the user A is simply eliminated, the client environment A (31-1) is eliminated automatically.

(4) Step S204

As in the first exemplary embodiment, the client management processing section 21 stores information on the association between the user and the client environment in the connection destination configuration table 24, and when there is a change in the association of the user and the client environment, rewrites the connection destination configuration table 24 automatically.

The user organization table 12A may be of a text data such as a CSV (Comma Separated Values) form or a directory service such as the Active Directory (registered trademark).

Although in this exemplary embodiment only a case, in which there is a change in the user attribute, has been described, when there is no change, the processings of Step S203 and Step S204 are not performed as in the first exemplary embodiment.

An effect of the second exemplary embodiment is that, even when there are a plurality of attributes attached to a user and the classification is complicated, it is possible to create an error-free client environment efficiently.

The third exemplary embodiment of the present invention will be described in detail below. For a part overlapping with the first and second exemplary embodiments, description will be omitted.

Figure 9:
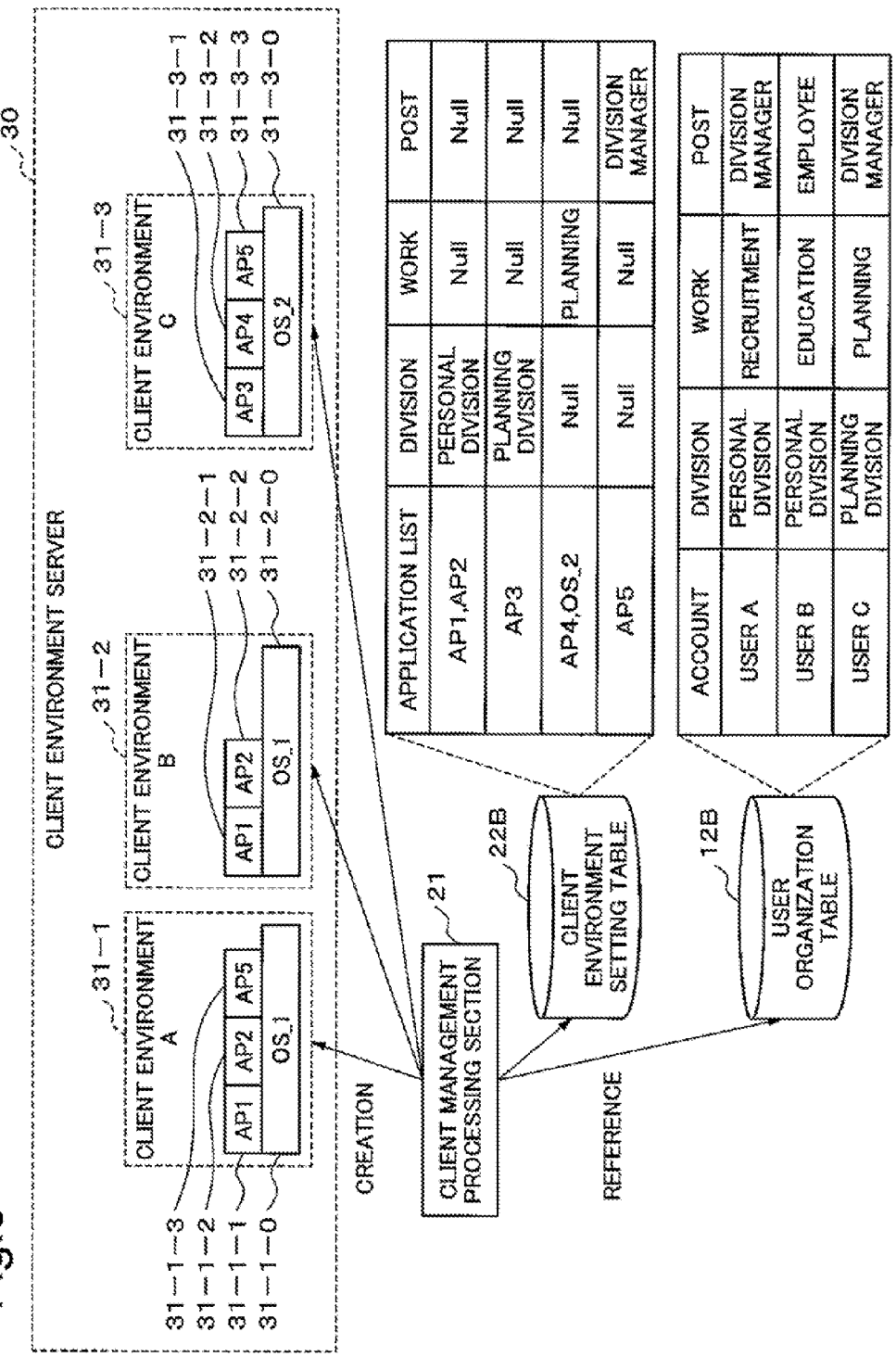
[FIG. 9] A conceptual diagram showing an exemplary configuration of a third exemplary embodiment.

As shown in FIG. 9, in the client environment configuration table 22B, not a template but a list of applications can be registered. In this case, the operating system (OS), as a base, is the same and applications (AP) installed on the OS can be selected as an option.

Here, a client environment configuration table 22B includes Application List, Division, Work and Post. In this example, Division, Work and Post all correspond to the attributes attached to the user. In Application List, identification information on an OS and an AP is stored. Such OS and AP operate on a client environment 31 (31-I, I=1 to n). That is, the OS and the AP are included in the client environment 31 (31-I, I=1–n).

Figure 10:
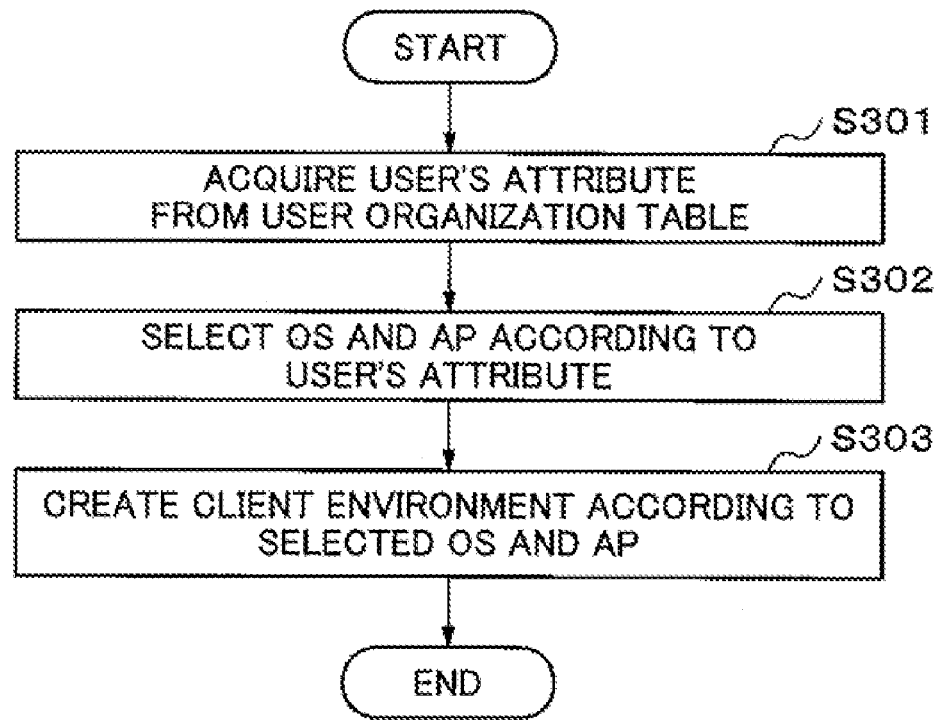
[FIG. 10] A flowchart showing operation of the third exemplary embodiment.

Operation in this exemplary embodiment will be described with reference to FIG. 10.

(1) Step S301

The client management processing section 21 acquires at least one attribute attached to the user with reference to a user organization table 12B.

(2) Step S302

The client management processing section 21 refers to the client environment configuration table 22B and selects an OS and an AP according to each of the attribute attached to the user.

(3) Step S303

The client management processing section 21 creates a client environment in the client environment server 30 based on the selected OS and AP.

Referring to FIG. 9, because the user A in the user organization table 12B falls under Division=Personal Division in the client environment configuration table 22B, AP1 and AP2 are selected, and falls under Post=Division Manager, then AP5 is selected, and thus a client environment A (31-1) is created. In this client environment A (31-1), the OS as a base will be OS_1 (31-1-0), and AP1 (31-1-1), AP2 (31-1-2) and AP5 (31-1-3) are created on it in a state where they are installed. Then, the client management processing section 21 refers to the client environment configuration table 22B, selects AP1, AP2 and AP5 according to each of the attributes attached to the user A, and creates the client environment A (31-1) in the client environment server 30.

Similarly, because the user B falls under Division=Personal Division, AP1 and AP2 are selected, and a client environment B (31-2) is generated. In this client environment B (31-2), the OS as a base is OS_1 (31-2-0), and AP1 (31-2-1) and AP2 (31-2-2) are created in a state where they are installed on it. For the OS, when not selected, a basic OS is used. When kinds of OS are included in Application List, it is possible to create environment based on the OS in the list.

In the case of the user C, he/her falls under Division=Planning Division, Work=Planning and Post=Division Manager, AP3, AP4, AP5 and OS_2 are selected, and a client environment C (31-1-3) is created. In this client environment C (31-3), the OS as a basis will be OS_2 (31-3-0), and AP3 (31-3-1), AP4 (31-3-2) and AP5 (31-3-3) are created in a state where they are installed on it. Just like the first exemplary embodiment, information on association between the user and the client environment is stored in the connection destination configuration table 24.

An effect of the third exemplary embodiment is that, applications according to the attributes attached to the user can be changed flexibly following a change in the work form not through a change in the template.

The fourth exemplary embodiment of the present invention will be described in detail below. Description and explanation for a part overlapping with the first to third exemplary embodiments will be omitted.

Figure 11:
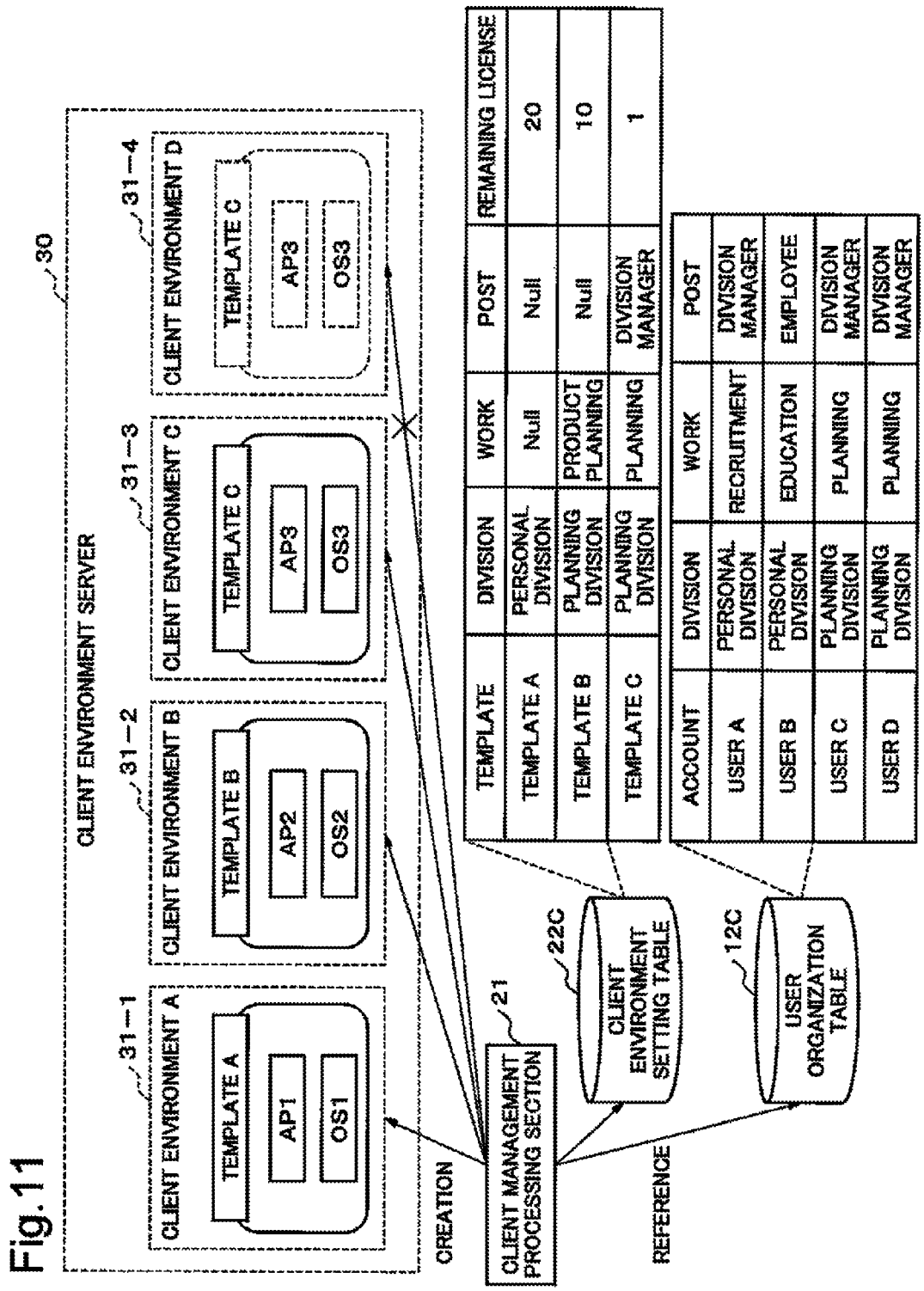
[FIG. 11] A conceptual diagram showing an exemplary configuration of a fourth exemplary embodiment.

As shown in FIG. 11, because there are actually many cases where a license is attached to an operating system (OS) or an application (AP), license management for a created client environment is needed to be performed. It is possible to set a number of remaining licenses in a client environment configuration table 22C, and each time a client environment is created, the number of remaining licenses is decreased. When this number becomes 0, a client environment cannot be generated any more from the template concerned. That is, the number of remaining licenses indicates a number of times that client environments can be created.

Here, the client environment configuration table 22C includes Template, Division, Work, Post and the Number of Remaining Licenses. In this example, Division, Work and Post all correspond to the attributes attached to the user. The Number of Remaining Licenses indicates the number of times that the client environments can be created. That is, the client environments can be created up to the number of remaining licenses.

Figure 12:
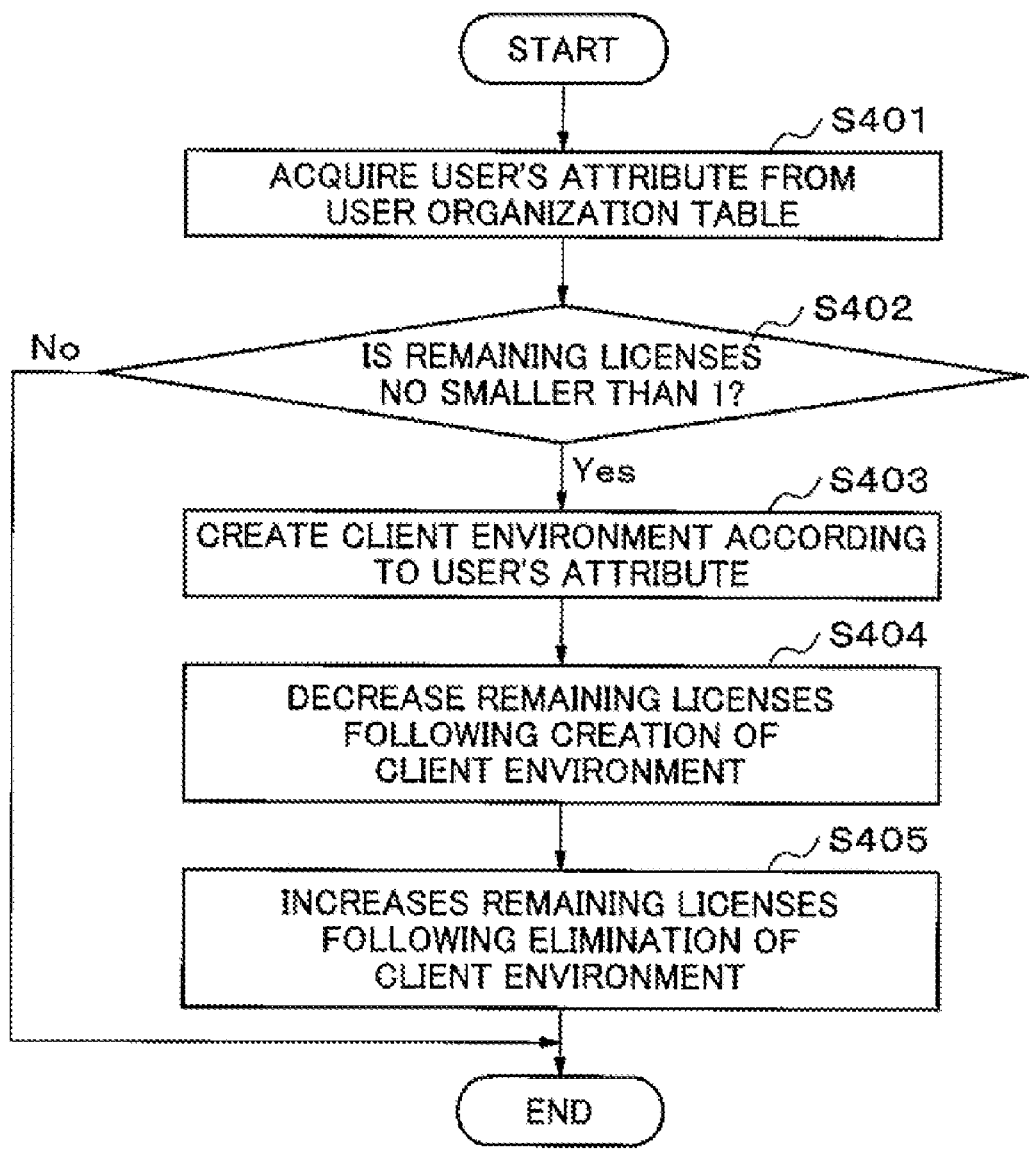
[FIG. 12] A flowchart showing operation of the fourth exemplary embodiment.

Operation in this exemplary embodiment will be described with reference to FIG. 12.

(1) Step S401

The client management processing section 21 acquires at least one attribute attached to the user with reference to the user organization table 12C.

(2) Step S402

The client management processing section 21 refers to the client environment configuration table 22C and checks the Number of Remaining Licenses of a template according to each of attributes attached to the user. At that time, when the Number of Remaining Licenses is 0 (No at Step S402), the client management processing section 21 finishes processing.

(3) Step S403

When the Number of Remaining Licenses is equal to or larger than one (Yes at Step S402), the client management processing section 21 refers to the client environment configuration table 22C, selects a template according to each of an attribute attached to the user, and creates a client environment in the client environment server 30 based on the selected template.

(4) Step S404

When the client management processing section 21 creates one client environment, the Number of Remaining Licenses of the client environment configuration table 22C concerned is reduced by one.

(5) Step S405

When one client environment disappears, the client management processing section 21 increases the Number of Remaining Licenses of the client environment configuration table 22C concerned by one.

Referring to FIG. 11, the client management processing section 21 creates the client environment A (31-1) based on the template A of the client environment configuration table 22C for the user A. When a client environment is created, the client management processing section 21 changes the number of remaining licenses of the client environment configuration table 22C from 20 to 19.

Similarly, the client management processing section 21 creates the client environment B (31-2) for the user B. When the client environment B (31-2) is created, the client management processing section 21 changes the number of remaining licenses of template B from 10 to 9.

The client management processing section 21 creates the client environment C (31-3) for the user C. When the client environment C (31-3) is created, the client management processing section 21 changes the number of remaining licenses of template C from 1 to 0.

Next, the client management processing section 21 tries to create a client environment D (31-4) based on template C for the user D, but the Number of Remaining Licenses is 0, then it does not actually create the client environment D (31-4). Similarly to the first exemplary embodiment, the client management processing section 21 stores information on the association between the user and the client environment in the connection destination configuration table 24.

An effect of the fourth exemplary embodiment is that it is possible to perform license management of an OS and an AP all at one using the client environment configuration table 22C.

Meanwhile, each exemplary embodiment of the present invention can be combined to be carried out.

As above, in the second to fourth exemplary embodiments of the present invention, there exist the user information processing section 11 and the user organization table 12 in the user management server 10. In the user organization table 12, there are stored a user and a group such as a division, to which the user belongs, or a work, and the user information processing section 11 processes information on them.

With reference to FIG. 1, in the management server 20, there exists the client environment configuration table 22. In this, a model, of what kind of client environment to be created for groups in the user organization table 12, is stored.

The management server 20 acquires information of the user organization table 12 and selects a model of a client environment which the user uses based on the information. This model is selected from the client environment configuration table 22 based on the attributes attached to the user. The client management processing section 21 creates a client environment 31 (31-I, I=1 to n) in the client environment server 30 from the selected model. Client environments corresponding to the number of users stored in the user organization table 12 are created.

At the same time, in the management server 20, the session management section 23 stores the association between the created client environment (100-1 to 100-n) and the user in the connection destination configuration table 24. Accordingly, the association indicating, which client environment the user uses, is stored in the connection destination configuration table 24.

As a result, by managing only the user and the attribute attached to the user, the creation of a client environment to be used and the configuration of the connection destination are automatically performed, then the management costs can be reduced. Also, by reducing an amount of information to be managed, influence from a human error is lowered, and as a result, it leads to improvements of work efficiency and of security.

In the present invention, creating automatically a client environment can be performed based on the user and the attribute attached to the user. Furthermore, associating between the user and the client environment, to which the user connects, can also be automatically performed, based on the attribute attached to the user concerned. When the attribute attached to the user is changed, creation/deletion of a client environment can be automatically performed and association for the created client environment can be performed.

By utilizing the present invention, when connecting to a computer from a remote terminal to use a client environment, a system that is not influenced by personnel transfer of a user can be constructed by performing the automatic creation/deletion of the client environment and by performing the connection control based on the user and the attribute attached to the user. A thin client system can be considered as an example of such a system.

This application is the National Phase of PCT/JP2009/054349, filed Mar. 2, 2009, which claims priority based on Japanese application Japanese Patent Application No. 2008-057599, filed on Mar. 7, 2008, the disclosure of which is incorporated herein in its entirety.

The invention claimed is:

1. A client environment creation system for creating a client environment, to which a user connects, comprising:
   a user information management server, which stores user information on the user; and
   a management server, which creates a client environment associated with said user based on said user information;
   wherein said user information management server includes:
      a user organization table, in which said user information is stored;
      a user information processing section, which provides data in said user organization table to said management server, and when said user information is changed, updates said user organization table;

a client environment configuration table, in which information on an association between said user information and information related to a client environment is stored; and a client management processing section, which refers to said user organization table, acquiring information related to said client environment from said client environment configuration table based on said user information, and creating said client environment in said client environment server.

2. The client environment creation system according to claim 1, wherein when said user information is changed, said management server eliminates said client environment, newly creates a client environment, and associates said changed user information with said newly created client environment.

3. The client environment creation system according to claim 1, wherein information on an association between said user information and an application included in said client environment is stored in said client environment configuration table, and wherein said client management processing section refers to said user organization table, acquires information on said application from said client environment configuration table based on said user information, and creates said client environment in said client environment server.

4. The client environment creation system according to claim 1, wherein said management server further includes:

a connection destination configuration table, in which the information on the association between said user and said client environment is stored; and a session management section which, when said client management processing section creates said client environment, associates said user with said client environment based on said user information, stores the information on the association between said user and said client environment in said connection destination configuration table, and connects said user to said client environment with reference to said connection destination configuration table.

5. The client environment creation system according to claim 4, wherein a number of remaining licenses, which indicates a maximum number of times for creating client environment, is stored in said client environment configuration table, and wherein said client management processing section refers to said client environment configuration table, and when said number of remaining licenses is equal to or larger than one, creates said client environment in said client environment server and decrements said number of remaining licenses by one.

6. A client environment creation method for creating a client environment, to which a user connects, comprising:

managing user information on said user; and creating a client environment associated with said user based on said user information;

wherein:

said managing user information on said user includes:

storing said user information in a user organization table;

updating said user organization table, when said user information is changed; and storing information on the association between said user information and information related to a client environment in a client environment configuration table; and said creating of said client environment includes referring to said user organization table, acquiring information related to said client environment from said client environment configuration table based on said user information, and creating said client environment.

7. The client environment creation method according to claim 6, further comprising:

when said user information is changed, eliminating said client environment;

newly creating a client environment; and associating said changed user information with said newly created client environment.

8. The client environment creation method according to claim 6, further comprising:

storing information on the association between said user information and an application, included in said client environment, in said client environment configuration table; and referring to said user organization table, acquiring information on said application from said client environment configuration table based on said user information, and creating said client environment.

9. The client environment creation method according to claim 8, further comprising:

storing information on the association between said user and said client environment in a connection destination configuration table; and when said client environment is created, associating said user with said client environment based on said user information, storing the information on the association between said user and said client environment in said connection destination configuration table, and connecting said user to said client environment with reference to said connection destination configuration table.

10. The client environment creation method according to claim 9, further comprising:

storing a number of remaining licenses, which indicates a maximum number of times for creating said client environment; and referring to said client environment configuration table, and when said number of remaining licenses is equal to or larger than one, creating said client environment and decrementing said number of remaining licenses by one.

11. A computer-readable data storage medium having stored thereon a computer program that when executed by a computer causes a method for creating a client environment, to which a user connects, be performed, the method comprising:

a step of managing user information on a user;

a step of creating a client environment, to which the user connects, in association with said user based on said user information;

wherein:

said managing user information on said user includes:

storing said user information in a user organization table;

updating said user organization table, when said user information is changed; and storing information on the association between said user information and information related to a client environment in a client environment configuration table; and said creating of said client environment includes referring to said user organization table, acquiring information related to said client environment from said client environment configuration table based on said user information, and creating said client environment.

12. A connection environment creation system which creates a connection environment that a user connects to, comprising:
 user information management means for storing user information on the user; and
 control means for creating a connection environment associated with said user based on said user information
 wherein said user information management means includes:
  organization information retaining means for storing said user information; and
  user information processing means for providing data retained in said organization information retaining means to said control means, and updating said organization information retaining means when said user information is changed.

13. The connection environment creation system according to claim 12, wherein
 when said user information is changed, said control means eliminates said connection environment, newly creates connection environment, and associates said changed user information with said newly created connection environment.

14. The connection environment creation system according to claim 12, wherein
 said control means includes:
 connection environment configuration information retaining means for storing information on an association between said user information and information related to said connection environment; and
 connection management processing means for referring to said organization information retaining means, acquiring information related to said connection environment from said connection environment configuration information retaining means based on said user information, and creating said connection environment.

15. The connection environment creation system according to claim 14, wherein
 said connection environment configuration information retaining means stores information on an association between said user information and an application processing which said connection environment provides, and wherein
 said connection management processing means refers to said organization information retaining means, acquires information on said application processing from said connection environment configuration information retaining means based on said user information, and creates said connection environment.

16. The connection environment creation system according to claim 14, wherein
 said control means further includes:
 connection destination configuration information retaining means for storing information on the association between said user and said connection environment; and
 session management means for, when said connection management processing means creates said connection environment, associating said user with said connection environment based on said user information, storing information on the association between said user and said connection environment in said connection destination configuration information retaining means, and connecting said user to said connection environment with reference to said connection destination configuration information retaining means.

17. The connection environment creation system according to claim 16, wherein
 said connection environment configuration information retaining means retains an upper limit value that indicates a maximum number of times for creating said connection environment, and wherein
 said connection management processing means refers to said connection environment configuration information retaining means, and when said upper limit value is equal to or larger than one, creates said connection environment, and decrements said upper limit value by one.

\* \* \* \* \*